UNITED STATES PATENT OFFICE.

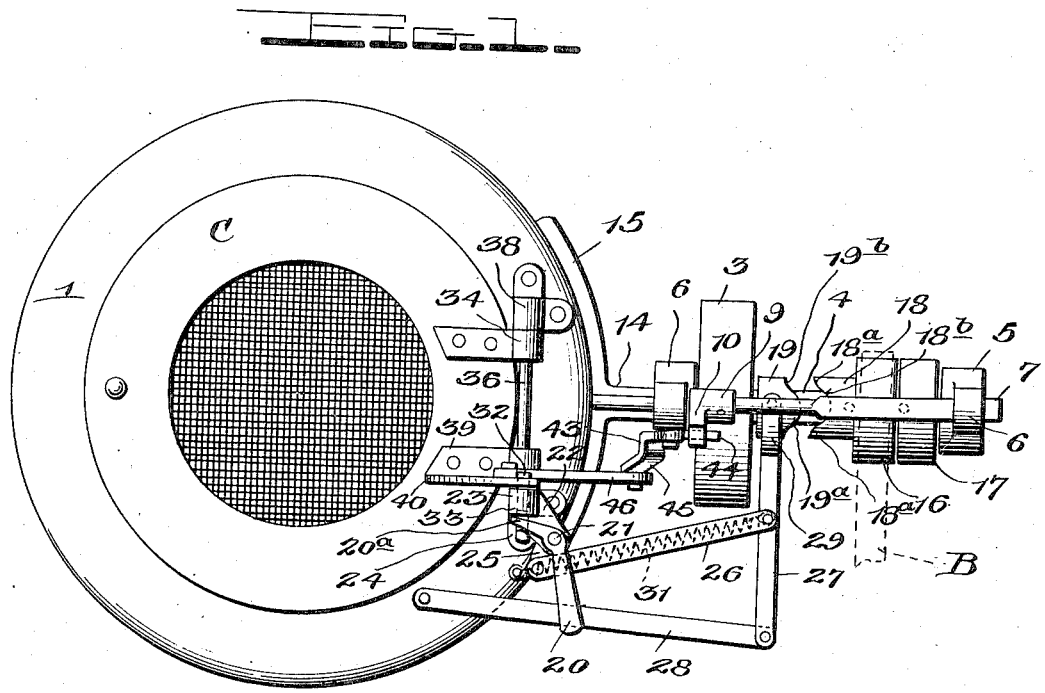
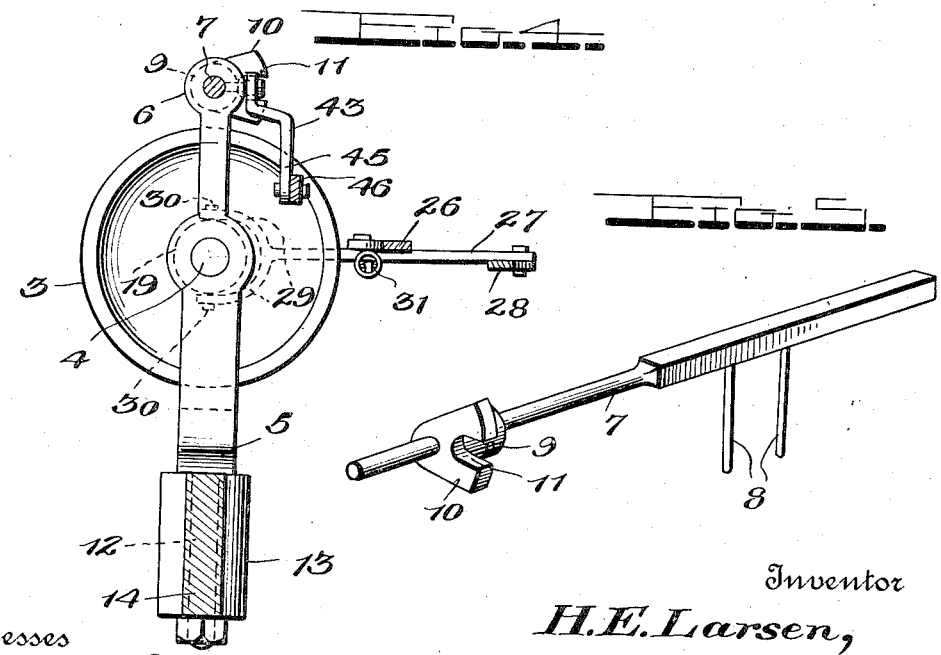

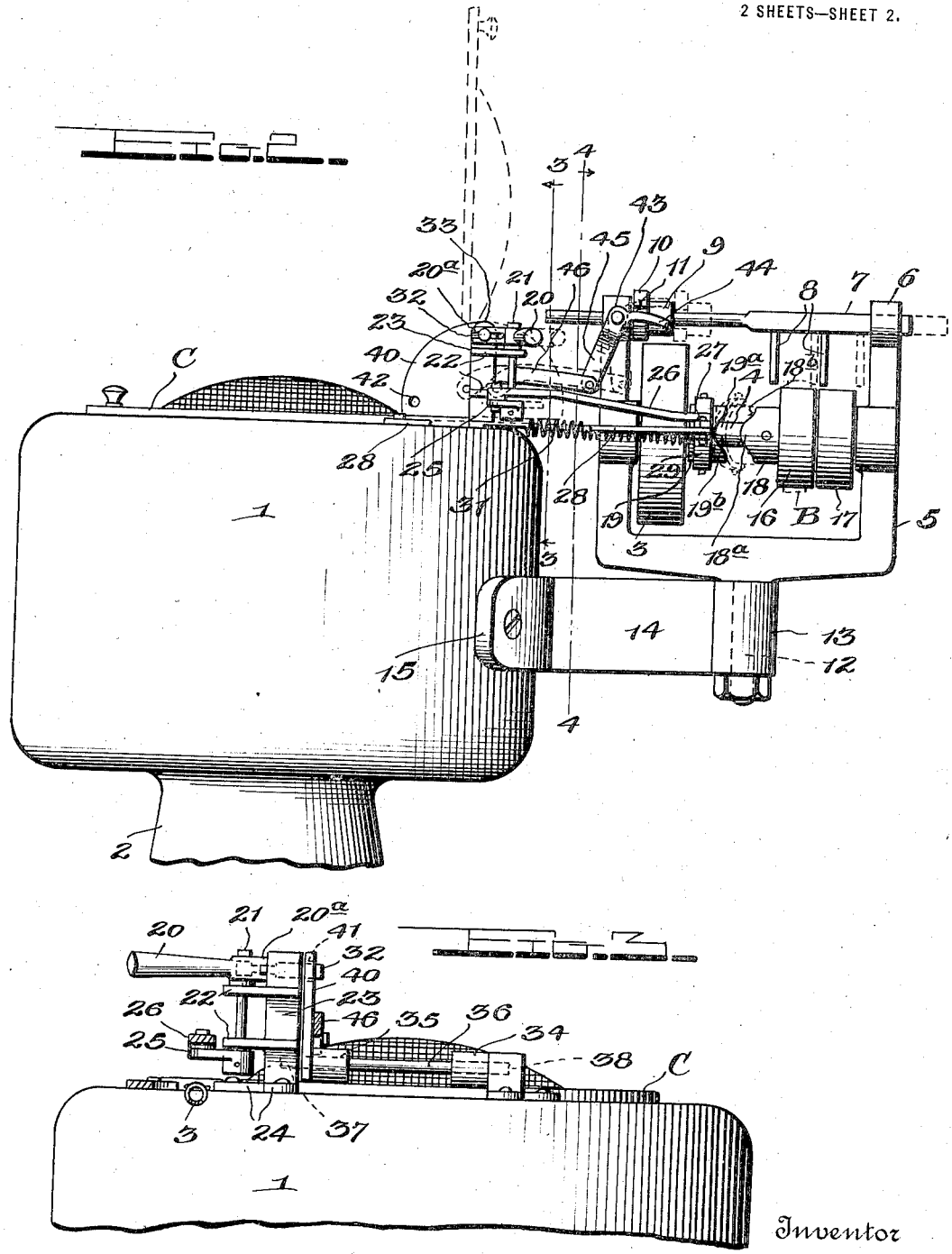

HOLGER EDWIN LARSEN, OF JANESVILLE, WISCONSIN.

SAFETY-COVER FOR LAUNDRY-EXTRACTORS.

1,192,327.  Specification of Letters Patent.  Patented July 25, 1916.

Application filed August 12, 1915. Serial No. 45,176.

*To all whom it may concern:*

Be it known that I, HOLGER E. LARSEN, a citizen of the United States, residing at Janesville, in the county of Rock and State of Wisconsin, have invented certain new and useful Improvements in Safety-Covers for Laundry-Extractors; and I do declare the following to be a full, clear, and exact description of the invention, such as will enable others skilled in the art to which it appertains to make and use the same.

This invention relates to a safety lock cover and more particularly to a cover of this character for laundry extractors in which said cover is locked in closed position during the rotation of the extractor.

The main object of the invention is to provide centrifugal laundry extractors and similar machines with a lock for securely retaining the cover in closed position during the operation of the machine and it is so constructed that the machine cannot be started while the cover is open.

Another object is to provide means controlled by the opening of the cover whereby the belt shifter is locked to prevent the shifting of the belt from the loose to the fixed pulley and operable on the closing of the cover to release the shifter.

With these and other objects in view, the invention consists of certain novel features of construction, and the combination and arrangement of parts as will be more fully described and claimed.

In the accompanying drawings: Figure 1 represents a plan view of a laundry extractor equipped with this improved device; Fig. 2 is a side elevation thereof with the cover closed; Fig. 3 is a vertical section taken on line 3—3 of Fig. 2; Fig. 4 is a similar view taken on line 4—4 of Fig. 2; Fig. 5 is a detail perspective view of the belt-shifter rod.

In the embodiment illustrated the invention is shown applied to a laundry extractor in which a casing or curb 1 of usual construction is mounted on a suitable base (not shown) and in which a revolving basket or carrier 2 is disposed and operated in the usual manner from a pulley 3 on the power shaft 4.

The power shaft 4 is revolubly mounted in the upright arms of a U-shaped bracket 5 preferably at points midway the length of said arms, the free ends of said arms being provided with bearings 6 in which a slidable rod 7 is mounted carrying the belt shifting arms or fingers 8, two of which are shown secured to the rod 7 in proper position for shifting the belt B from the fast to the loose pulley and vice versa according to the direction in which the rod 7 is reciprocated. A sleeve 9 is also carried by this rod 7 and has a sector 10 projecting radially therefrom and provided with an inwardly extending slot 11 for a purpose to be described. One end of the rod 7 is shown angular and the bearing on the arm of the U-shaped bracket 5 in which it is mounted is correspondingly shaped to provide for the longitudinal shifting of the rod and yet prevent rotation thereof.

The U-shaped bracket 5 has a depending shank or stem 12 extending from the outer face of its cross bar and which is mounted in a vertical sleeve 13 carried by a bracket 14 secured to the outer face of the casing 1. As shown, this bracket 14 is provided at its inner end with laterally extending curved arms 15 which are adapted to fit the curved face of the casing 1 and are secured thereto by any suitable fastening means.

A fast pulley 16 is secured to the shaft 4 and a loose pulley 17 is rotatable thereon and arranged adjacent the fast pulley between it and the outer arm of the U-shaped bracket 5 in convenient position to provide for the shifting of the belt B from one pulley to the other as may be desired for throwing the machine into and out of operation. A cam member 18 is secured to the inner face of the fixed pulley 16 and is designed to coöperate with a sliding cam member 19 mounted on said shaft 4 and with which is connected the cover locking and releasing lever 20 which is here shown in the form of a bell crank having a fulcrum 21 fixed at the angle thereof and rotatably mounted in apertured spaced ears 22 carried by a standard 23 secured to the upper end of the casing 1, said standard being here shown provided with laterally extending feet 24 by means of which it is bolted to the casing 1. The fulcrum 21 of the lever 20 has an arm 25 fixed at one end thereto and with the other end of which is pivotally connected a link or pitman 26. The free end of this link 26 is pivotally connected with a lever 27 fulcrumed at one end to a supporting bar 28 which extends laterally from the upper end of the casing. The other end of this lever 27 is bifurcated and the furcations 29 thereof straddle the sliding cam member 19 and are engaged with studs 30 which project laterally from said clutch member at diametrically opposite points.

A coiled spring 31 is connected at one end to the upper end of the casing 1 adjacent the standard 23 and at its other end to the lever 27 at a point opposite the point of connection of the link 26, the same fastening element being here shown connecting the two members. This coiled spring 31 is in the form of a pull spring and exerts its tension to hold the sliding cam member 19 normally away from the locking member 18 and also tends to hold the lever 20 in locking engagement with the cover, as will be hereinafter more fully described. This action of the lever 20 is accomplished through the link or pitman 26, the spring 31 exerting its tension to force said lever inward and thereby cause the arm 25 with which it is connected to also move inwardly and thus turn the fulcrum 21 of said lever 20 and the lever carried thereby.

A pin 32 is carried by the short arm 20<sup>a</sup> of the lever 20 and projects at right angles from the outer face of its free end and is slidably mounted in a sleeve or socket 33 carried by the upper end of the standard 23, said pin projecting normally beyond said socket and being held in projected position by the action of the spring 31 as above described.

The extractor cover C is shown hingedly connected with the upper end of the casing 1 by means of laterally spaced knuckles 34 and 35 through which a pintle 36 passes and is revolubly mounted at one end in a bearing 37 formed at the lower end of the standard 23 and at its other end in a bearing 38 fixed to the casing 1 in alinement with the bearing 37 of the standard. The knuckle 35 has a strap 39 extending radially therefrom and radially of the cover C which latter is here shown circular in form and is secured to said cover by riveting or otherwise. A plate 40 is here shown extending upwardly at right angles to the outer edge of the strap 39 being preferably made integral therewith. This plate is constructed in the form of a sector, one edge of which is connected to the strap and the other right angular edge thereof is arranged perpendicular to the cover. This sector shaped plate 40 is provided at its corners with apertures 41 and 42 which are designed to receive the locking pin 32 carried by the lever 20 when the cover is in opened or closed position and by means of which said cover is locked in either of its positions. When the cover is closed, the pin 32 engages the aperture 41 at the outer corner of the plate 40 and when it is opened, it engages the aperture 42 at the inner corner thereof, as is shown in Figs. 2 and 3.

A bell crank lever 43 is fulcrumed at its angle on the bearing formed at the upper end of the inner arm of the U-shaped bracket 5 and one arm thereof is made in the form of a pin 44 and normally extends rearwardly substantially parallel with the belt shifter rod 7. The other arm 45 of said bell crank lever 43 depends from its fulcrum and has pivotally connected with the free end thereof, one end of a link 46 the other end of which is pivotally mounted on the plate 40 adjacent its inner imperforate corner.

From the above description, it will be obvious that the cover C is locked in either its open or closed position by means of the pin 32 which springs automatically into engagement with one of the apertures 41 or 42 according to the position in which the cover is disposed and when the cover is in closed position, the pin shaped arm 44 of the bell crank lever 43 will be positioned in alinement with the slot 11 formed in the sector 10 carried by the belt shifter rod 7 so that said rod may be reciprocated freely without interference by said pin.

When the cover is opened into the position shown in Fig. 3, the rearward movement of the link 46 connected with the arm 45 of the bell crank 43, will swing said bell crank rearwardly and the pin shaped arm 44 thereof upwardly into position to engage an imperforate portion of the sector 10 carried by the rod 7 and thus lock said rod against shifting rearwardly whereby the shifting of the belt from the loose pulley 17 to the fixed pulley 16 is prevented and hence the machine cannot be set in operation until after said cover has been closed and the pin 44 moved out of the path of the sector 10 and disposed opposite the slot 11 therein to provide for its free reciprocation to actuate the shifter arms or fingers 8 for shifting the belt from the loose to the fast pulley.

The arrangement and construction of the cam members 18 and 19 as shown, is such that the sliding member 19 cannot enter and engage the member 18 while the machine is in operation or rather while the belt B is engaged with the fixed pulley 16 as the rapid rotation of its pulley and the cam member 18 carried thereby will automatically force the member 19 away from it and prevent the cams of said member from entering the coöperating recesses in said fixed pulley until after the machine has come to a dead stop. This is owing to the peculiar formation of the cam faces of the members 18 and 19, the member 18 being shown provided with two oppositely disposed curved projections or cams 19<sup>a</sup> and two corresponding oppositely disposed curved recesses 19<sup>b</sup>, while the member 18 is provided with similar projections or cams and recesses 18<sup>a</sup> and 18<sup>b</sup> so that the engagement of said members during the rotation of the member 18, causes the projections 18<sup>a</sup> on said member to engage the corresponding projections 19ª on the sliding member and force said sliding member away from the fixed member and thus prevent them from being connected. Immediately, however, that the shaft 4 and the cam member 18 fixed thereto are at rest, the projections 19ª of the sliding member 19, will enter the recesses 18ᵇ of the fixed member and thus permit said sliding member 19 to move outwardly and thereby provide for the turning of the lever 20 and its fulcrum sufficiently to release the pin 32 from the aperture 42 in the free corner of the plate 40 and thus release the cover and permit it to be swung in open position. When the projections 19ª enter the recesses 18ᵇ, the shaft will be held against rotation until they are removed therefrom, because of the fact that the member 18 is fixed to said shaft while the sliding member is held in a non-rotatable position thereon. The opening of the cover as above described through the operation of the lever 46 actuates the bell crank lever 43 to position the pin 44 thereof so that it will engage the sector 10 on the belt shifter rod 7 and thus lock said rod against forward movement such as is necessary for shifting the belt B from the loose to the fast pulley and hence the machine will remain out of operation and cannot be started until after the cover has been closed, said cover being held in open position by the engagement of the pin 32 with the aperture 41 in the plate 40. Immediately after the pin 32 enters the aperture 41, the link or pitman 26 under the action of the spring 31 will force the lever 27 forward and thus disengage the sliding cam member 19 from the member 18 positioning them a sufficient distance apart to provide for the rearward movement of said sliding member 19 when it is desired to release the pin from the aperture 41 to permit the closing of the cover. After the pin 32 has been released from the aperture 41 and the cover closed, the sliding cam member 19 again moves away from the member 18 and the pin 44 of the bell crank 43 moves downwardly into the position opposite the slot 11 in the sector 10 and thus permits the rod 7 to be shifted forwardly to permit the clutch fingers 8 to shift the belt B from the loose pulley 16 to the fast pulley 17 and again throw the machine into operation.

From the above description, it will thus be observed that careless operators will be fully protected by preventing them from having access to the basket while it is rotating and also by preventing them from starting the machine before the cover of the basket has been closed. From the above description, it will also be obvious that this safety device for protecting careless operators may be applied to all kinds and forms of extractors as well as to other machines having a movable member to be locked and controlled as above described.

I claim as my invention:

1. In a safety device, a movable member, a rotating shaft, means for locking said member in one position, releasing means for said locking means, and means on said shaft for holding the releasing means against actuation while the shaft is rotating.

2. In a safety device, a movable member, a rotating shaft, means for locking said member in one position, releasing means for said locking means, sliding means carried by said shaft and connected with said releasing means to control the operation thereof, and means on said shaft for preventing the shifting of said sliding means in a direction to release said locking means during the rotation of the shaft.

3. In a safety device, a movable member, a rotating shaft, means for locking said member in one position, resilient means for holding said locking means in operative position, manually operated means for releasing said locking means against the tension of said resilient holding means, and means carried by said shaft and connected to lock said releasing means while the shaft is rotating and to release said releasing means when the shaft is still.

4. In a safety device, a movable member, a rotating shaft, means for locking said member in one position, a cam member slidable on said shaft, releasing means for said locking means connected with said cam member and operable to shift said member in one direction on the releasing of said locking means, and a coöperating cam member fixed on said shaft and having means to prevent the engagement therewith of the sliding cam member during the rotation of the shaft and thus preventing said sliding member from shifting in a direction to permit the actuating of the lock releasing means while the shaft is rotating.

5. In a safety device, a movable member, a rotating shaft, means for locking said member in one position, a cam member slidable on said shaft, releasing means for said locking means connected with said cam member and operable to shift said member in one direction on the releasing of said locking means, and a coöperating cam member fixed on said shaft, said cam members having longitudinal extending curved projections on their meeting faces adapted to engage and ride over each other during the rotation of the shaft whereby said sliding cam member is held away from said fixed cam member and the lock releasing means held against actuation while the shaft is rotating.

6. In a safety device, a movable member, a rotating shaft, means for locking said member in one position, a cam member slidable on said shaft, a lever engaged at one end with said cam member and fulcrumed at its other end on a support, a pitman pivoted at one end to said lever intermediately of the ends of said lever, lock releasing means connected with the other end of said pitman, a spring connected to hold said cam member normally in retracted position and the locking means in operative position, and a fixed cam member on said shaft, said cam members having means for preventing the projection of the sliding member into operative engagement with the other during the rotation of the shaft yet permitting such engagement on the stoppage of the shaft.

7. In a safety device, a movable member, a rotating shaft, means for locking said member in one position, a cam member slidable on said shaft, a lever engaged at one end with said cam member and fulcrumed at its other end on a support, a pitman pivoted at one end to said lever intermediately of the ends of said lever, a bell crank lever fulcrumed adjacent said locking means and having one arm thereof connected with said locking means, an arm fixed to the fulcrum of said bell crank and connected with said pitman, a coiled spring connected at one end to the lever engaged with the cam member at a point adjacent the connection of the pitman therewith and to a fixed support adjacent said releasing means whereby the sliding cam member is held retracted and the locking means engaged.

8. In a safety device, a pivoted member, a plate extending laterally from said member adjacent its pivot and provided with spaced apertures, a locking pin slidably mounted in a plane at right angles to said plate in position to enter one or the other of said apertures according to the position of said pivoted member, a bell crank fulcrumed adjacent said pin and having one end engaged therewith for retracting and projecting said pin, an arm fixed to the fulcrum of said bell crank, a rotating shaft, a member shiftable on said shaft, a lever engaged with said member and fulcrumed at one end on a support, a pitman pivoted at one end to said arm and at its other end to said lever intermediately of its ends, a coiled spring secured at one end to said lever by the pivot of said pitman and at its other end adjacent the arm to which the other end of the pitman is connected, and means on said shaft for preventing the movement of the shifting member thereon in one direction during the rotation of the shaft.

9. In a safety device, a casing, a pivoted member, a sector shaped plate secured at one straight edge to said member with its curved edge extending inwardly, said plate having apertures in the corners thereof adjacent the curved edge thereof, a locking pin slidably mounted in a plane at right angles to said plate in position to enter one or the other of said apertures according to the position of said pivoted member, a bell crank fulcrumed adjacent said pin and having one end engaged therewith for retracting and projecting said pin, an arm fixed to the fulcrum of said bell crank, a rotating shaft, a member shiftable on said shaft, a lever engaged with said member and fulcrumed at one end on a support, a pitman pivoted at one end to said arm and at its other end to said lever intermediately of its ends, a coiled spring secured at one end to said lever by the pivot of said pitman and at its other end to said casing, and means on said shaft for preventing the movement of the shifting member thereon in one direction during the rotation of the shaft.

10. In a safety device, a pivoted cover, a rotary shaft, fixed and loose belt pulleys on said shaft, a belt for engaging said pulleys, a belt shifter rod arranged parallel with said shaft and mounted to slide longitudinally, belt engaging fingers carried by said rod for shifting the belt from one pulley to the other on the shifting of said rod in one direction or the other, locking means carried by said cover and said rod, and coöperating locking means supported adjacent thereto, said means being actuated upon opening of the cover to prevent shifting of the rod.

11. In a safety device, a pivoted cover, a rotary shaft, operating means for said shaft, means for shifting said operating means to either rotate or discontinue rotation of said shaft, controlling means to prevent operation of said shifting means in a proper direction to rotate said shaft when the cover is opened, and means operable on the opening of the cover for locking said shaft against rotation.

12. In a safety device, a pivoted cover, a rotary shaft, fixed and loose belt pulleys on said shaft, a belt for engaging said pulleys, a belt shifter rod arranged parallel with said shaft and mounted to slide longitudinally, belt engaging fingers carried by said rod for shifting the belt from one pulley to the other on the shifting of said rod in one direction or the other, a member extending laterally from said rod and having an opening therein, a finger pivotally mounted adjacent said rod, connections between said finger and cover for moving the finger to position it opposite the opening in said rod carried member when the cover is closed and opposite an imperforate portion of said member when the cover is open whereby the rod is locked against movement in one direction when the cover is open and permitted to move in both directions when the cover is closed.

13. In a safety device, a pivoted cover, a rotary shaft, fixed and loose belt pulleys on said shaft, a belt for engaging said pulleys, a belt shifter rod arranged parallel with said shaft and mounted to slide longitudinally, belt engaging fingers carried by said rod for shifting the belt from one pulley to the other on the shifting of said rod in one direction or the other, a member extending laterally from said rod and having an opening therein, a bell crank fulcrumed adjacent said rod and having one arm extended toward the member on said rod, and a link connecting the other arm with said cover whereby the free arm of said bell crank is raised or lowered according to the position of the cover for locking or unlocking the shifting rod.

14. In a safety device, a movable member, a rotating shaft, means for locking said member in one position, releasing means for said locking means, means on said shaft for holding the releasing means against actuation while the shaft is rotating, and means operable on the opening of said movable member to prevent the shaft from being started.

In testimony whereof I have hereunto set my hand in presence of two subscribing witnesses.

HOLGER EDWIN LARSEN.

Witnesses:
A. E. BINGHAM,
F. L. GLEASON.